(12) United States Patent
Knight

(10) Patent No.: US 10,889,354 B2
(45) Date of Patent: Jan. 12, 2021

(54) SELF-DEPLOYING FLOAT

(71) Applicant: James A. Knight, Pearl City, IL (US)

(72) Inventor: James A. Knight, Pearl City, IL (US)

(73) Assignee: Aqua-Aerobic Systems, Inc., Loves Park, IL (US)

(*) Notice: Subject to any disclaimer, the term of this patent is extended or adjusted under 35 U.S.C. 154(b) by 50 days.

(21) Appl. No.: 16/430,868

(22) Filed: Jun. 4, 2019

(65) Prior Publication Data

US 2019/0291825 A1    Sep. 26, 2019

Related U.S. Application Data

(63) Continuation of application No. 15/646,473, filed on Jul. 11, 2017, now Pat. No. 10,351,213, which is a continuation of application No. 14/042,874, filed on Oct. 1, 2013, now Pat. No. 9,731,793.

(51) Int. Cl.
| | |
|---|---|
| *B63B 22/00* | (2006.01) |
| *B63B 35/36* | (2006.01) |
| *F04D 13/06* | (2006.01) |
| *B63B 22/04* | (2006.01) |
| *C02F 3/16* | (2006.01) |
| *B01F 3/04* | (2006.01) |
| *B01F 13/00* | (2006.01) |

(52) U.S. Cl.
CPC .......... *B63B 22/00* (2013.01); *B01F 3/04595* (2013.01); *B01F 13/0049* (2013.01); *B63B 22/04* (2013.01); *B63B 35/36* (2013.01); *C02F 3/16* (2013.01); *F04D 13/066* (2013.01); *Y02W 10/10* (2015.05)

(58) Field of Classification Search
CPC ......... B63B 22/00; B63B 22/04; B63B 35/36; B01F 13/0049; B01F 3/04453; C02F 3/16; F04D 13/066; Y02W 10/10
See application file for complete search history.

(56) References Cited

U.S. PATENT DOCUMENTS

| | | | |
|---|---|---|---|
| 9,731,793 B1 * | 8/2017 | Knight | .................... B63B 22/04 |
| 9,902,469 B2 * | 2/2018 | Knight | .................... B63B 22/04 |
| 10,351,213 B2 * | 7/2019 | Knight | ................ B01F 13/0049 |

OTHER PUBLICATIONS

Aqua-Aerobic Systems, Inc. Bulletin #950K, Apr. 2013: Aqua-Jet Surface Mechanical Aerator.
Aqua-Aerobic Systems, Inc. Bulletin #150R, Jul. 2013: Aqua-Jet Surface Mechanical Aerator 50Hz.
Aqua-Aerobic Systems, Inc. Bulletin #200D, Oct. 2012: Aqua-Jet II Contained Flow Aerator.
Aqua-Aerobic Systems, Inc. Bulletin #702F, Sep. 2012: AquaDDM Direct-Drive Mixer.

* cited by examiner

*Primary Examiner* — Ajay Vasudeva
(74) *Attorney, Agent, or Firm* — Vitale, Vickrey, Niro & Gasey LLP

(57) ABSTRACT

A self-deploying float assembly to support mechanical equipment such as aerators and mixers for use in water, wastewater and process water stream treatment basins and a method of installing same.

18 Claims, 6 Drawing Sheets

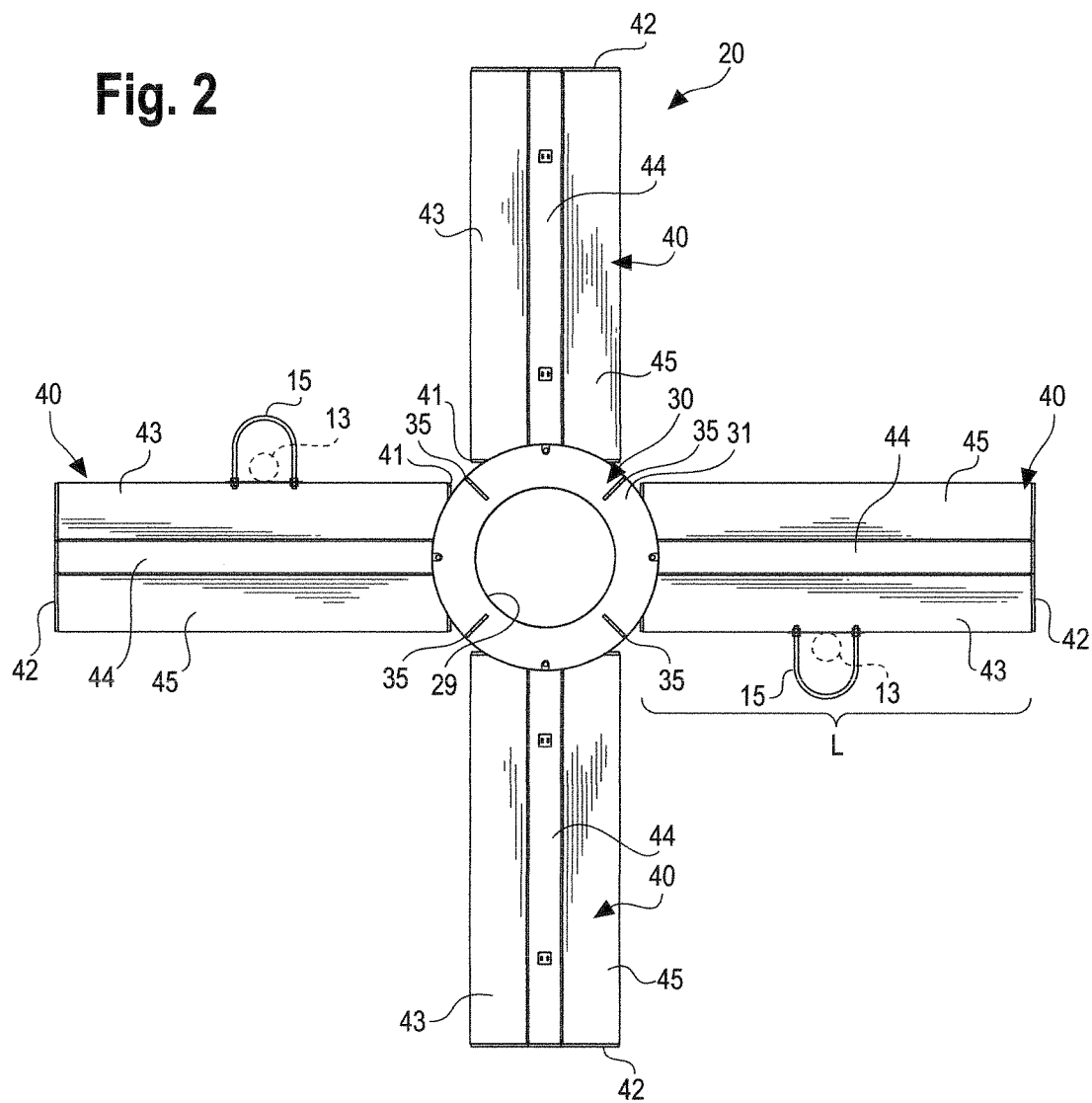
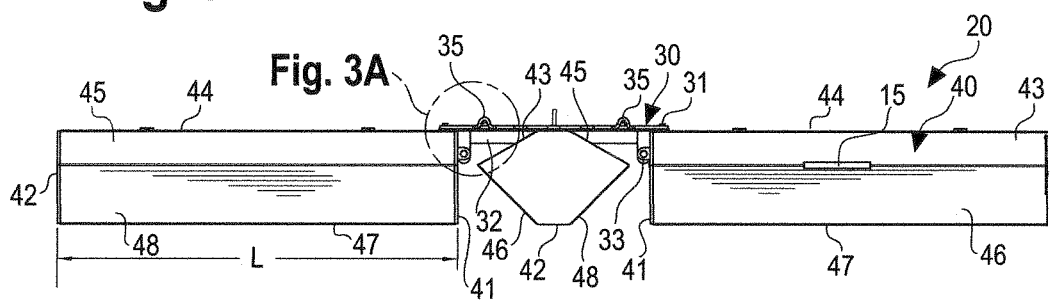

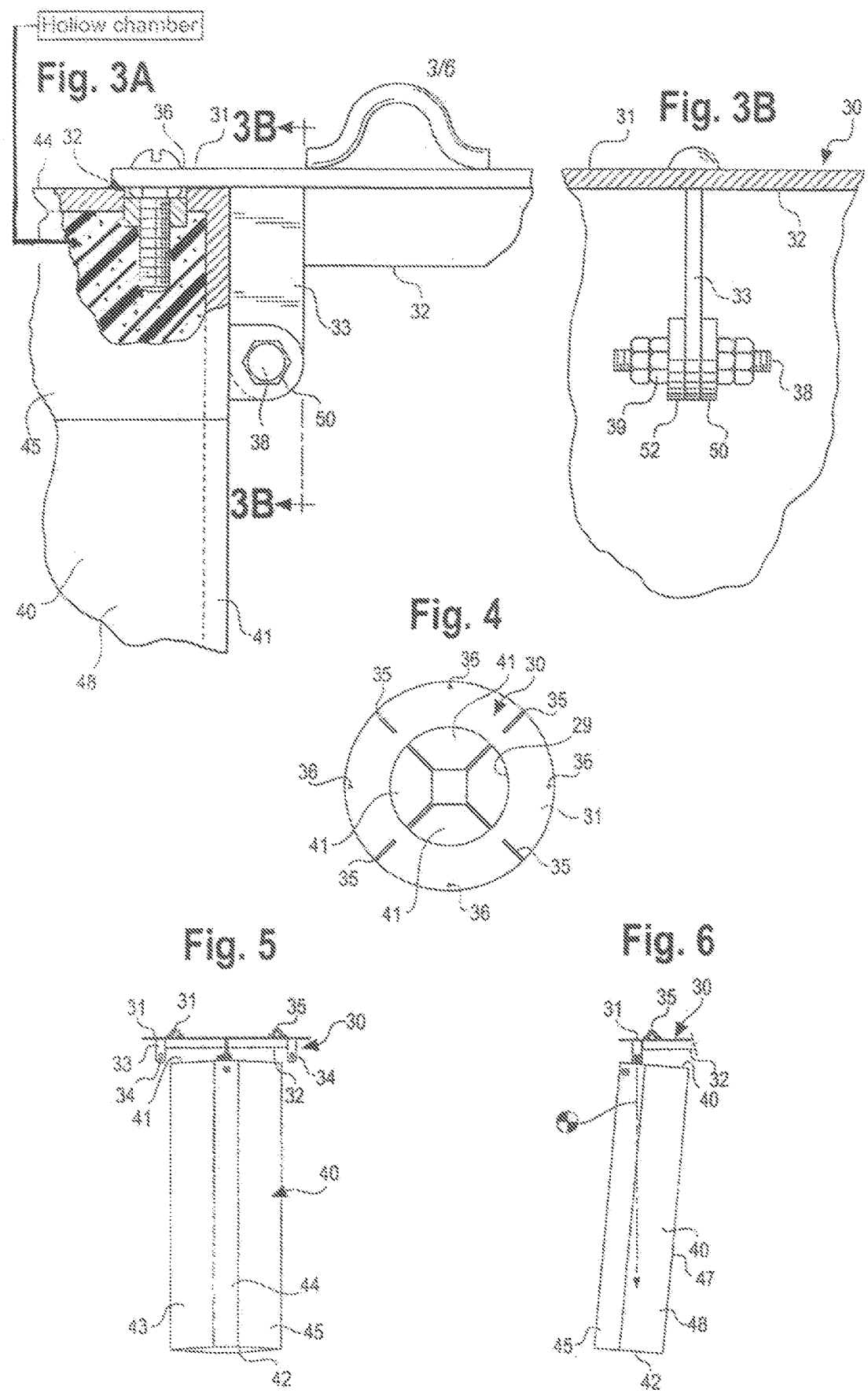

SELF-DEPLOYING FLOAT

This application is a continuation of and claims priority to U.S. application Ser. No. 15/646,473, filed on Jul. 11, 2017, now allowed, which is a continuation of claims priority to U.S. Pat. No. 9,731,793 B1 on Aug. 15, 2017, which are incorporated herein in their entirety by reference.

FIELD OF THE INVENTION

The present inventions relate to floats typically used in the water and wastewater treatment industry. More particularly, the present inventions relate to floats that may be installed in a folded position and which unfold, i.e., self-deploy, upon placement in water or other liquid.

BACKGROUND OF THE INVENTION

Floats to suspend a mechanical device on the surface of liquid in a basin are fairly well known in the water and wastewater treatment industry. For example, surface mechanical aerators are floated on the surface of water or wastewater to be aerated. Typical surface mechanical aerators are sold by Aqua-Aerobic Systems, Inc. of Rockford, Ill. under the trade names AquaJet® and AquaJet II®. In general, these devices have an aerator mounted to a rigid, typically circular float that must be of sufficient size to generate enough buoyancy to support the aerator equipment. Similarly, surface mechanical mixers are also supported on floats on the surface of water or wastewater in a lagoon or basin. A typical surface mechanical mixer is available from Aqua-Aerobic Systems, Inc. under the trade name AquaDDM®. Like an aerator, a mixer is mounted on a generally circular, solid float. Again, such floats must have fairly large diameters (if circular) so that they generate sufficient buoyancy to support the associated mechanical equipment. The floats are typically moored into place in the desired location so that they do not move during use or otherwise.

Installing aerators, mixers and other mechanical devices and their associated floats is straightforward in open basins. Because the lagoons or basins are open, the size of the mechanical device and associated float does not impede installation or impose a size restriction on the equipment that may be used. Similarly, in new facilities, consideration may be made in advance for the installation, repair and replacement of equipment. However, many existing basins are enclosed in a building or other structure. There is limited ability in such structures to provide access to install new or replacement equipment. Thus, there is a physical limitation on the size of equipment that may be installed in existing enclosed locations, because access through existing roofs, walls and even doors is limited. Accordingly, while it is relatively easy to accommodate installation of equipment in new and open basins, many existing facilities have enclosed basins and have limited access to the interior, making it more difficult to retrofit different devices into the location to accommodate changing needs or requirements.

For example, many drinking water treatment installations or treatment steps are enclosed. In the treatment of drinking water, certain by-products of disinfection, such as trihalomethanes (THMs) are formed. Increasing government regulations require the removal of THMs, which may effectively be done using surface mechanical aeration, the most common form for which is floating aeration. However, because many existing drinking water treatment facilities are enclosed, having roof structures with limited openings available for the introduction of new equipment, traditional and known floats that support aerators and other equipment on the surface of the basin are too large to fit within the available openings of such installations.

Thus, there is a need, particularly in the water and wastewater treatment industry, to provide a float assembly that may fit through a fenestration or other reasonably available or created opening of an enclosed treatment basin, while at the same time providing sufficient buoyancy to support the associated equipment such as aerators, mixers and the like.

SUMMARY OF THE INVENTION

The present inventions preserve the advantages of known floats for mechanical or other equipment and also provide new features and advantages.

Therefore, it is an object of the present invention to provide a float assembly that is sufficiently compact so that it may be installed through a fenestration in an enclosed basin.

It is another object of the present invention to provide a float assembly that self-deploys upon placement into a liquid in a basin and provides sufficient stability to support mechanical equipment.

An additional object of the present invention is to provide a float assembly that may be used with a variety of mechanical equipment, which may also be installed through a fenestration of an enclosed facility.

A further object of the present invention is to provide a float assembly that may be in a folded condition for transportation and installation and which becomes unfolded and self-deployed upon placement in a liquid in a basin.

Still another object of the present invention is to provide a surface mechanical mixer or aerator that may be retrofitted into an enclosed basin used in conjunction with a self-deploying float assembly.

Yet an additional object of the present invention is to provide a foldable float assembly, the floats of which may be opened from a folded position and locked into an unfolded or deployed position.

Yet a further object of the present invention is to provide a float assembly having segmented floats that fold vertically for shipping and installation through a structure opening and which self-deploys or may be otherwise deployed to a horizontal, unfolded position.

Yet another object of the present invention is to provide a float assembly having a compact footprint (or taking-up a small volume of space) for reduced shipping costs and ease of handling and installation, while at the same time having sufficient buoyancy to support mechanical equipment.

Accordingly, the present inventions provide a self-deploying float assembly including a central support bracket for use in a basin having a liquid level. The assembly further includes a plurality of floats, each float having a proximal and distal end, a length and a cross-sectional shape. A plurality of hinges, each hinge pivotably mounting the proximal end of each float to the central support bracket such that each float may pivot between a downward, generally vertical or folded position and an upward, generally horizontal or unfolded position for use, are also provided. Preferably, the cross-sectional shape of each of the plurality of floats is a hexagon or a diamond. The central support bracket of the float assembly is capable of accepting and securing a mechanical device and may include hoisting hooks for use during installation and removal of the assembly. Hinges and/or the central support bracket of the float assembly may also be configured to prevent the floats from pivoting beyond a generally horizontal position. In other embodiments of the inventions, the floats may be secured to the central support bracket when in a generally horizontal and deployed position. A mooring bracket may also be provided.

The present inventions also provide a folding float assembly to support a mechanical device (such as a mixer or aerator) on a liquid in a basin, the float assembly including a support bracket; a plurality of floats, each float having a proximal end, a distal end, a length and a cross-sectional shape; a plurality of hinges, each hinge pivotably mounted to the proximal end of each float to the support bracket such that each float may pivot from a downward, generally vertical position upward to a generally horizontal position. The cross-sectional shape of the floats may be a hexagon, diamond or other cross-sectional shapes. Means for locking the floats to the support bracket in the generally horizontal and deployed position may also be provided. At least one float may also include a mooring bracket and hoisting hooks on the support bracket may also be provided.

The present inventions further provide for a method of installing a self-deploying float assembly through a fenestration in a structure and into a basin containing a liquid having a liquid level. The steps of the method include lowering a self-deploying float assembly through the opening in a roof so that the float deploys upon contact with the liquid, the self-deploying float assembly including a central support bracket, a plurality of floats pivotably attached to the central support bracket with a plurality of hinges which permit the plurality of floats to pivot between a generally vertical position to a generally horizontal position when placed in the liquid; locking the plurality of floats to the central support bracket in the generally horizontal position; and installing mechanical equipment into said float assembly. The method may also include the step of mooring the float assembly and associated mechanical equipment to a stationary post in the basin.

The present inventions still further provide a foldable float assembly for installation in an empty or dry basin, having a central support bracket; a plurality of floats, each float having a proximal end and a distal end, a length and a cross-sectional shape; and, a plurality of hinges, each hinge pivotably mounting the proximal end of each float to the central support bracket such that each float may pivot between a downward, generally vertical position and an upward, generally horizontal position. The floats may also be secured to the central support bracket when in the generally horizontal position and the hinges and the central support bracket may prevent the floats from pivoting beyond a generally horizontal position. The foldable float of the present inventions may also provide a central support bracket that is capable of accommodating a mechanical device. Preferably the cross-sectional shape of each of the plurality of floats is hexagonal.

INVENTOR'S DEFINITION OF THE TERMS

The following terms which may be used in the various claims and/or specification of this patent are intended to have their broadest meaning consistent with the requirements of law:

"Basin," as used herein, is used in its broadest sense and includes, among other things, basins, tanks, lagoons and reservoirs used for at least one step in the treatment of water, wastewater and process water.

"Structure opening" or "fenestration," as used herein, is used in its broadest sense to refer to any opening, whether existing or created, in a roof, wall or other structure enclosing and/or covering a basin.

"Mechanical equipment," as used herein, is used in its broadest sense to include any equipment to be supported by a float assembly in a basin, including but not limited to aerators, mixers and the like.

Where alternative meanings are possible, in either the specification or claims, the broadest meaning is intended. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 2 is a top plan view of a preferred float assembly of the present invention (without the associated mechanical equipment) in an unfolded or deployed position;

FIG. 3 is a side plan view of the preferred float assembly of FIG. 2;

FIG. 3A is a detailed side view of the attachment of a float to the central support bracket of the present invention using a preferred single point hinge assembly, taken from insert 3A of FIG. 3;

FIG. 3B is a side view of the preferred hinge assembly of FIG. 3A, taken along line 3B-3B of FIG. 3A;

FIG. 4 is a top plan view of the float assembly of the present invention shown with the floats in a folded position;

FIG. 5 is a front plan view of a preferred float assembly of the present invention showing the central support bracket and one preferred float attached thereto;

FIG. 6 is a side plan view of a portion of the central support bracket and one attached float of FIG. 5, also showing the preferred center of gravity of the attached float;

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 7:
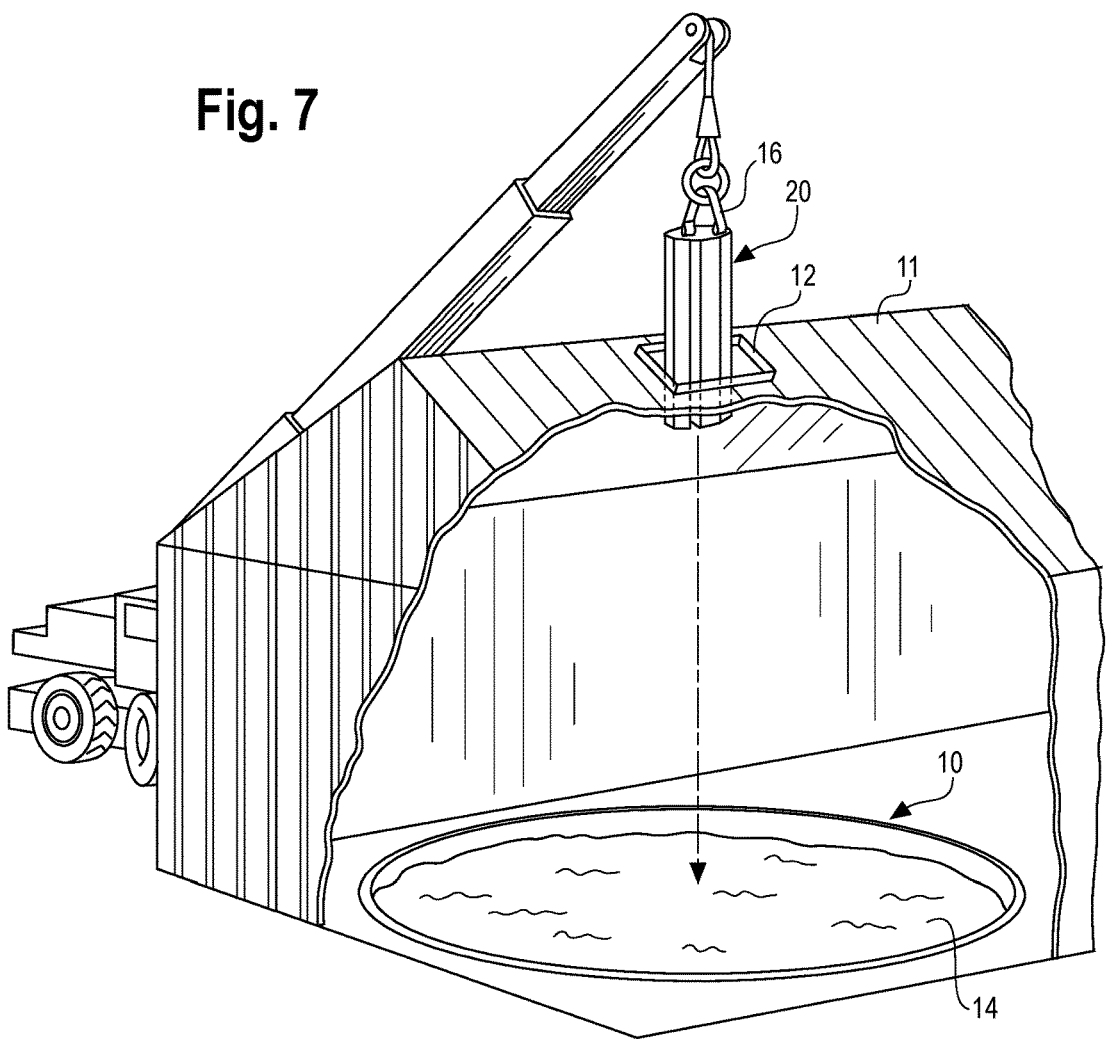
FIG. 7 is a perspective view of the float assembly of the present invention showing a representative installation through a fenestration of a typical enclosed basin.
Figure 8:
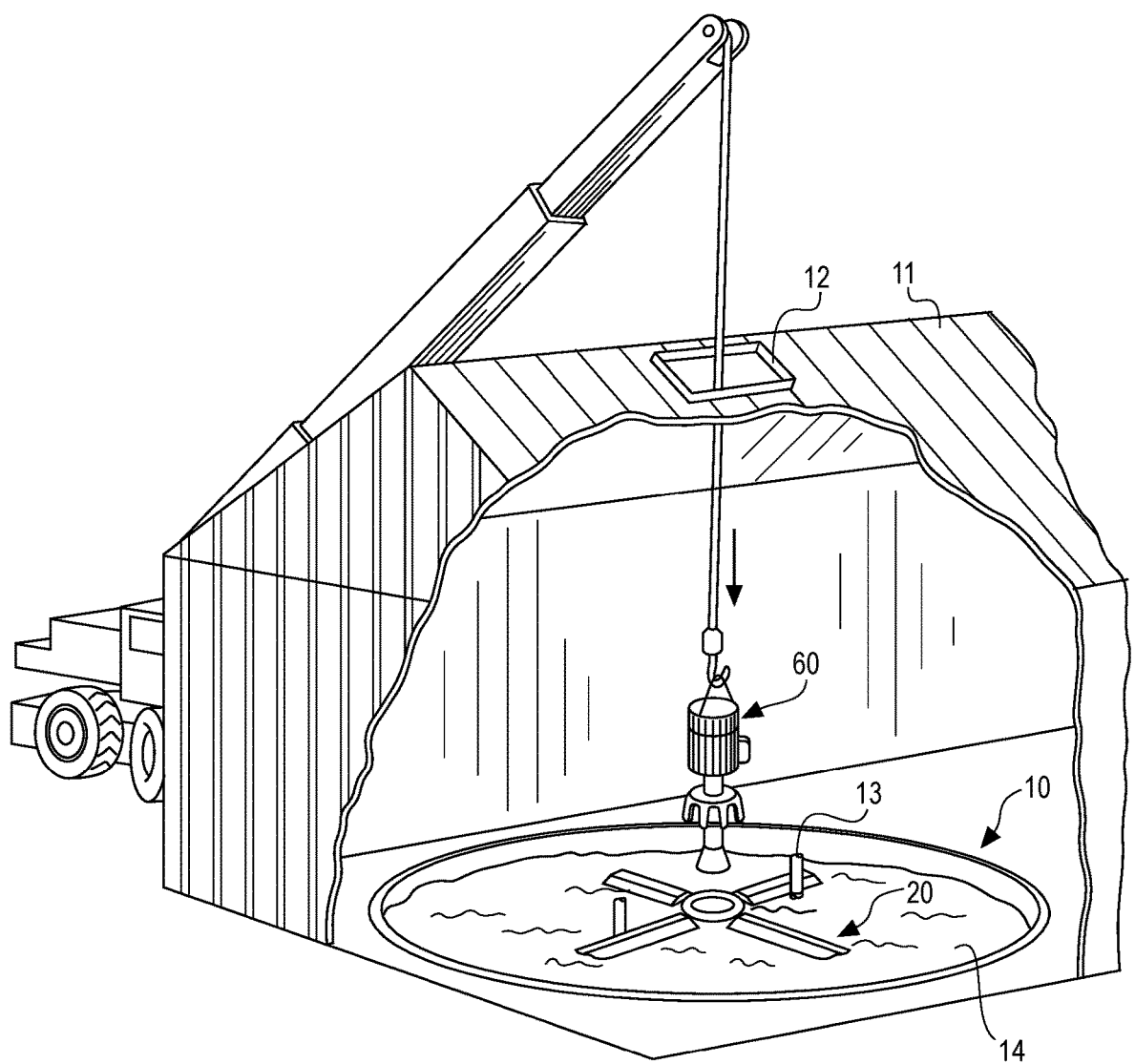

Although not limited thereto, the present inventions have particular applicability to use in existing water or wastewater treatment facilities include a basin 10 having a liquid level 14 that is enclosed by walls and a roof 11 (see FIGS. 7 and 8). In such facilities, often the most efficient way to access the interior of the facility to install equipment is through a fenestration 12 or other opening in the roof 11 at a point above the basin 10. Because of joists, beams and other structural members of the roof, only a modest fenestration or opening 12 exists or may be created in the roof 11 for purposes of installing equipment. It is through such an opening that the present inventions may be introduced and are most advantageous.

It will also be understood by those of skill in the art that the present inventions may be employed in basins 10 that are not enclosed or are dry at the time of installation, since the present inventions provide decreased shipping and storage costs. And, even in enclosed basins 10, the present inventions do not have to be introduced into the facility through a fenestration 12 in the roof 11. Instead, for example, the present inventions may be introduced through a door or loading bay and then installed in the basin 10. In addition, it will be understood that the present inventions are also applicable to and may be installed into facilities in which the basin has been drained and there is no liquid level, such that deployment of the floats is manual.

Figure 1:
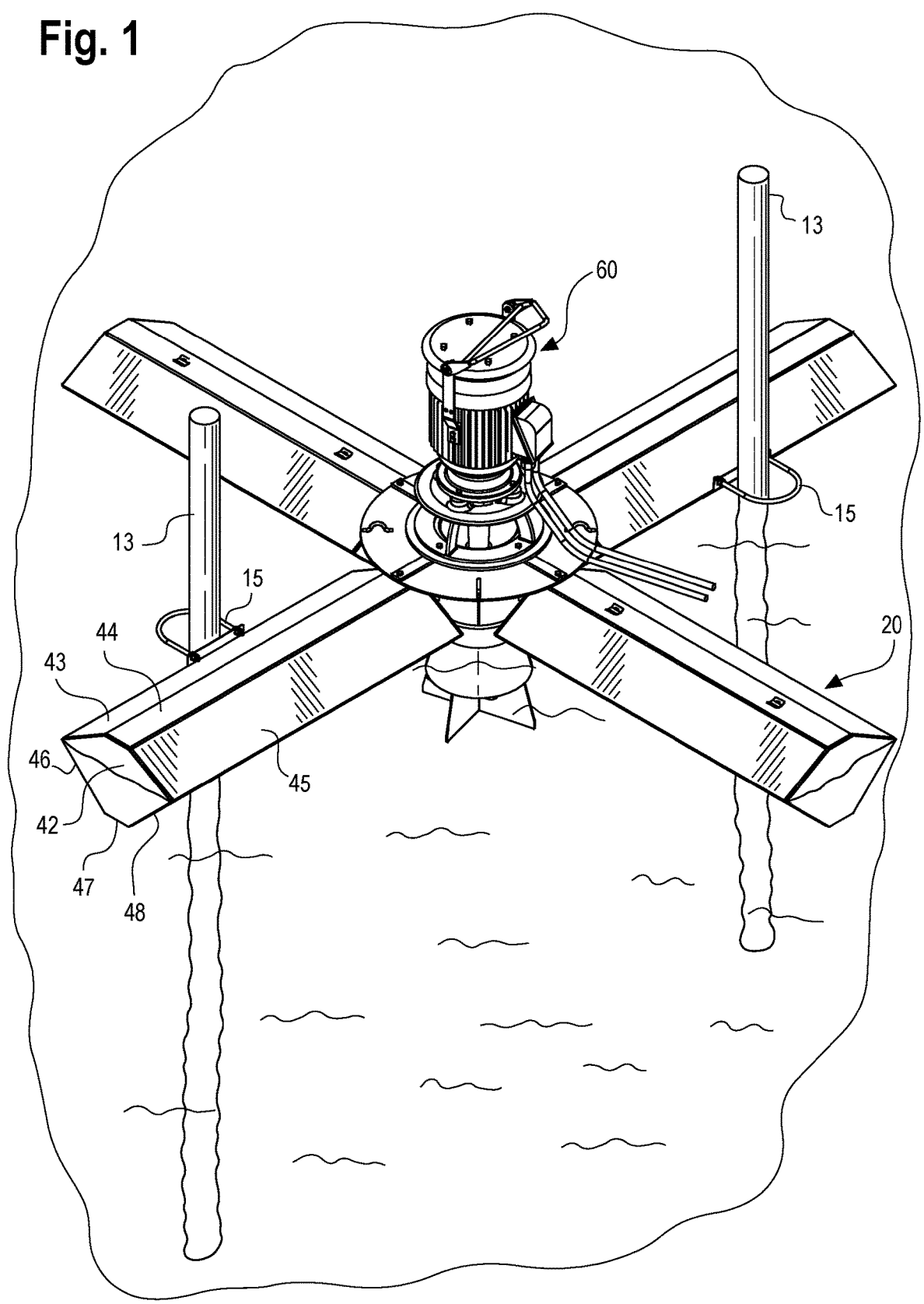
FIG. 1 is a perspective view of a preferred embodiment of the present invention shown deployed in a basin and supporting a typical aerator on the surface of a liquid.

FIG. 1 shows a preferred embodiment of a float assembly 20 of the present invention shown fully deployed and supporting a typical piece of mechanical equipment 60 (an aerator) installed in a typical basin 10. The float assembly 20 is moored in place in basin 10 using mooring post 13. Details of a preferred embodiment of the self-deploying float assembly 20 of the present invention is shown in more detail in FIGS. 2-6. The stages of the installation and self-deployment of preferred float assembly 20 is shown in FIGS. 7-8.

Float assembly 20 includes a central support bracket 30. Support bracket 30 includes an upper surface 31 and a lower surface 32. In the preferred embodiment, support bracket 30 is circular. However, it will be understood by those of skill in the art that other shapes, such as square, trapezoid or rectangle, may also be used. Support bracket 30 is also provided with an equipment opening 29 that is designed to accommodate an aerator, mixer or other mechanical equipment 60. It will also be understand that while opening 29 is shown as circular, any shaped opening may be used consistent with the requirement of the mechanical equipment 60 to be used and supported.

The lower surface 32 of central support bracket 30 is provided with a plurality of pivot brackets 33 (FIGS. 3, 5 and 6). Each pivot bracket 33 is attached to and projects downwardly from the lower side 32 and each pivot bracket 33 includes an aperture 34. Pivot bracket 33 and associated aperture 34 are intended to mate with double pivot brackets 50 and their associated apertures 51 which are attached to the proximal end 41 of the float 40 to pivotably mount float 40 to support member 30 in a hinged fashion as hereinafter described. In the preferred embodiment, there are four pivot brackets 33 spaced evenly around the circumference of support member 30 to accommodate four floats 40 as hereinafter described. It will be understood by those of skill in the art that more or less than four floats 40 may be utilized, depending upon the application and required buoyancy.

Upper surface 31 of support bracket 30 is provided with a plurality of hoisting hooks 35. Hoisting hooks 35 are provided to enable the float assembly 20 to be lowered into the facility as hereinafter described (see e.g., FIG. 7). The support bracket 30 is also provided with a plurality of locking holes 36 that are used to secure floats 40 in an unfolded or generally horizontal position when fully deployed and installed, also as hereinafter described.

Each of the plurality of floats 40 has a proximal end 41, a distal end 42 and a length L. Preferably, each float 40 is formed to have three upper surfaces; namely, a generally horizontal top surface 44 and two non-horizontal upper surfaces 43 and 45. It will be understood by those of skill in the art that the three upper surfaces 43, 44 and 45 may be formed from a single sheet of material or separate pieces of material. Preferred float 40 also includes three lower surfaces; namely, a lower generally horizontal surface 47 and two non-horizontal lower surfaces 46 and 48, which also may be formed from a single sheet of material or multiple pieces of material. The surfaces 43-48 of float 40 form a generally hexagonal cross-section that is preferred for reasons of compactness and buoyancy. It will be understood by those of skill in the art that float 40 may have other cross-sectional shapes resulting in more or less float surfaces, such as a rectangle, circle, diamond and the like. However, the generally hexagonal cross-sectional shape is preferred because it is more compact when in the folded position (see FIGS. 4 and 7A) and provides sufficient buoyancy to support the mechanical equipment 60. In addition, the generally horizontal top surface 44 enables float 40 to be locked to central support bracket 30 in the installed position, if desired.

In the preferred embodiment, float 40 is constructed from stainless steel. Surfaces 43-48, along with proximal end 41 and distal end 42, form a hollow, generally waterproof interior which is filled with polyurethane foam to provide the desired buoyancy. It will be understood by those of skill in the art that other materials of construction and fillers for buoyancy may be used. In addition, one or more floats 40 of float assembly 20 may include a mooring bracket 15 that cooperates with mooring post 13 to keep the float assembly 20 and mechanical equipment 60 in place within the basin 10 (see e.g., FIGS. 1 and 8).

The proximal end 41 of float 40 is provided with a double pivot bracket 50. Double pivot bracket 50 includes a hole 51 (see FIGS. 3, 5 and 6). Double pivot bracket 50 is designed to sandwich single pivot bracket 33 suspended from support bracket 30. Holes 34 of single pivot brackets 33 align with holes 51 on double pivot brackets 50. A hinge bolt 38 is inserted through holes 34 and 51 and secured in place with hinge nuts 39. In this manner, float 40 may pivot on support bracket 30 from a downward, generally vertical or folded position, upward to a generally horizontal or unfolded position (compare FIGS. 7A and 7E).

Figure 7A:
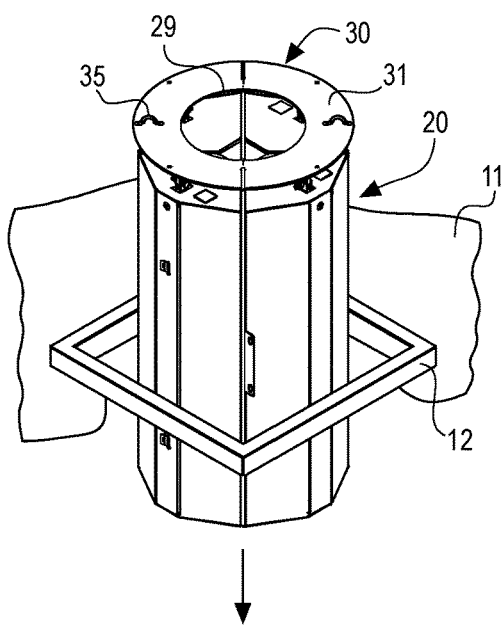
FIG. 7A is a close-up perspective view of the preferred float assembly during its initial stage of installation through the fenestration on the roof.
Figure 7B:
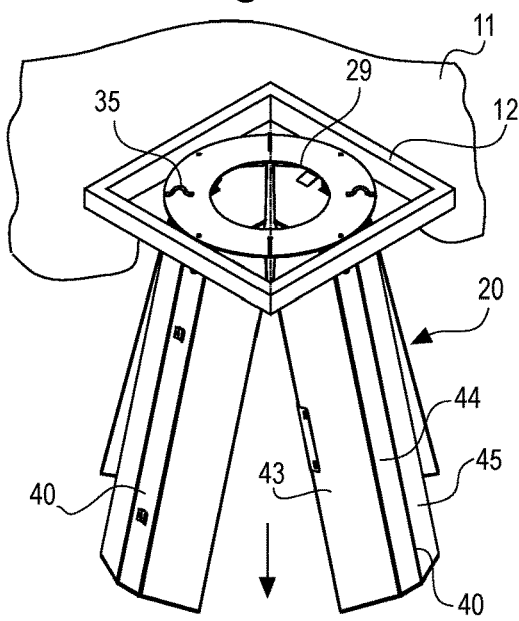
FIG. 7B is a perspective view of the float assembly of FIG. 7A shown during a later stage of a typical installation.

In a preferred embodiment, the center of gravity of floats 40 is located inside of the vertical pivot point as shown in FIG. 6. As a result, the floats 40 are naturally biased or spread slightly outward as shown in FIGS. 6 and 7B. This is beneficial, since it allows the float 40 to more easily and surely deploy as the float assembly 20 is lowered into the water 14 (see e.g., FIGS. 7C and 7D). To keep the silhouette of float assembly 20 as small as possible and to aid in shipping, floats 40 may be banded (not shown) into a tight cluster as shown in FIGS. 4 and 7A. Once the assembly 20 arrives at the site and the float assembly 20 is lowered through and clears fenestration 12, the shipping band is cut or otherwise removed (compare FIGS. 7A and 7B). In a preferred embodiment, the float assembly 20 is then lowered into the liquid in basin 10 and self-deploys as shown in FIG. 7. Other embodiments may use manual deployment or unfolding.

Once the floats 40 are fully deployed and/or unfolded, they may be locked in the horizontal position. Preferably, upper generally horizontal float surface 44 is provided with a threaded locking aperture 52 near proximal end 41. Threaded locking aperture 52 is located on surface 44 to align with hole 36 on support bracket 30. In this manner, when float 40 is in the unfolded, generally horizontal and deployed position, float 40 may be secured to support bracket 30 using a lock bolt 53 inserted through hole 36 into threaded locking aperture 52. It will be understood by those of skill in the art that other ways to lock floats 40 in the horizontal position may be used consistent with the present inventions. However, it is not required to lock the floats 40 in a horizontal position.

Having described the structure and arrangement of the components of a preferred embodiment of float assembly 20, installation of a self-deploying embodiment and operation will now be described, particularly by reference to FIGS. 7-8. As shown in FIG. 7, float assembly 20 is lifted with a crane 17 or other hoisting method using straps 16 that are attached to hoisting hooks 35. During the initial stage of installation, the floats 40 are banded together (not shown) so that float assembly 20 is in its most compact position (FIGS. 7 and 7A). Once float assembly 20 clears structure opening 12 (see FIG. 7B), the band (not shown) is cut or otherwise removed.

Figure 7C:
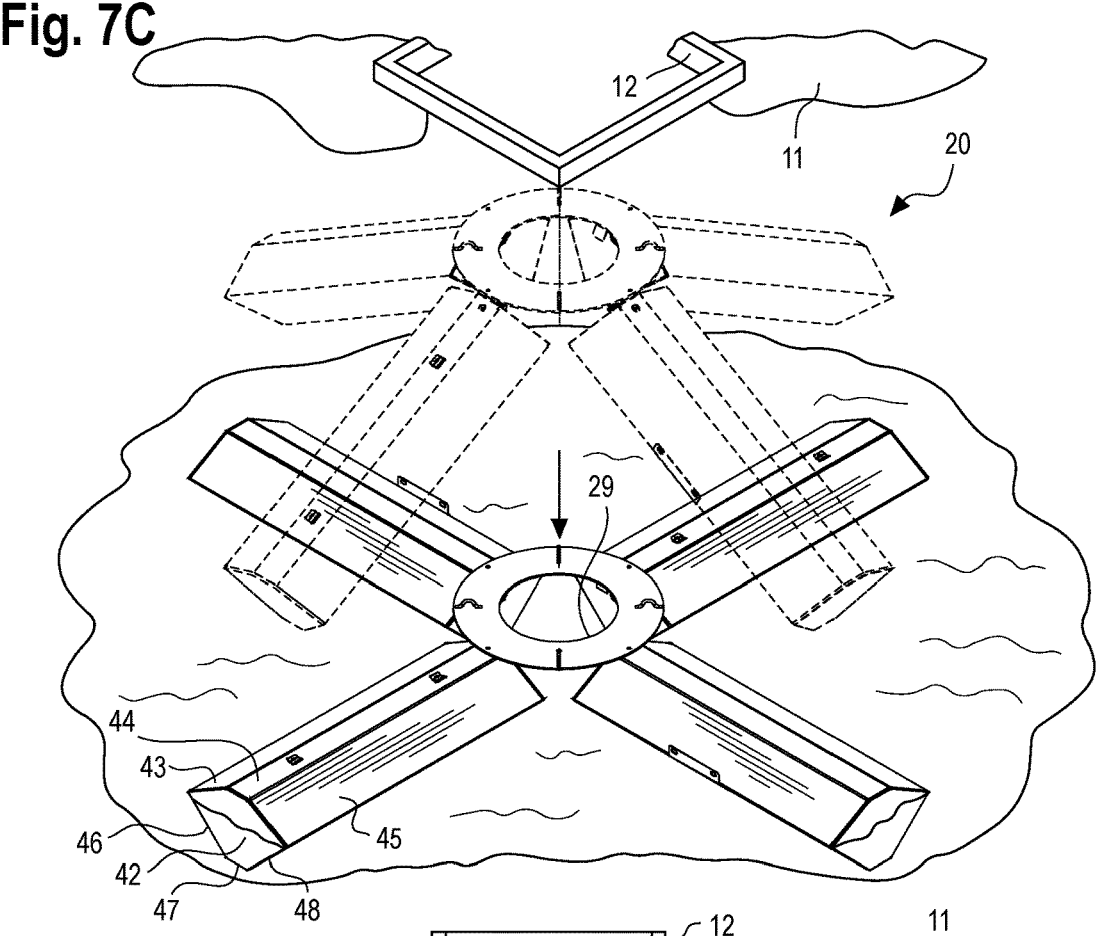
FIG. 7C is a perspective view of the preferred float assembly in still further stages of installation, the assembly in dashed lines showing partial deployment upon initial contact with the liquid in the basin and the assembly in solid lines showing the fully deployed position.
Figure 7D:
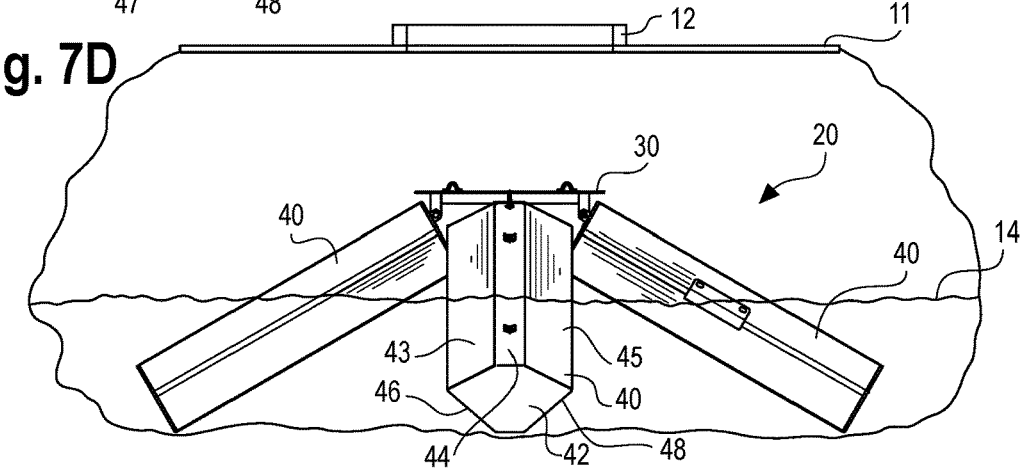
FIG. 7D is a side view of the preferred float assembly shown in a partially deployed position similar to the stage of installation of the embodiment shown in dashed lines in FIG. 7C.
Figure 7E:
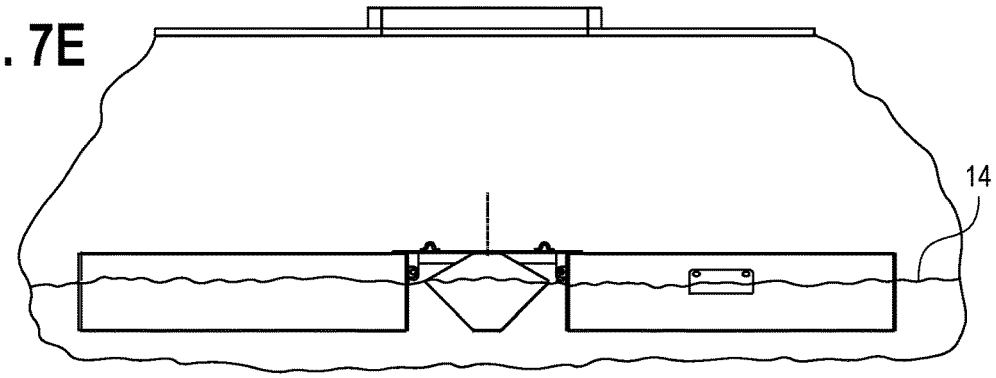
FIG. 7E is a side view of the preferred float assembly shown in a fully deployed or unfolded position similar to the embodiment shown in solid lines in FIG. 7C; and, FIG. 8 is a perspective view of a representative aerator being installed through an opening in the roof for placement onto the fully deployed float assembly.

When float assembly 20 hits liquid level 14, floats 40 begin to deploy from the generally vertical position to a horizontal position (see FIG. 7C, dashed line, and FIG. 7D). Float assembly 20 continues to be lowered until floats 40 are in a generally fully horizontal position (see e.g., FIG. 7C, solid line, and FIG. 7E). Floats 40 may then be locked in the horizontal position to support bracket 30 using locking bolt 53 through locking hole 36 into threaded locking aperture 52 on surface 44 of float 40. Upon installation, straps 16 are removed and float assembly 40 may be moored to mooring post 13 with mooring bracket 15.

Once float assembly 40 is installed in basin 10 (see FIG. 7), the desired mechanical equipment 60 is then lowered through structure opening 12 (see FIG. 8). Mechanical equipment 60 is then secured to central support bracket 30 through equipment opening 29. It will be understood by those of skill in the art that the installation described is merely typical, and other methods of installation may be utilized depending upon the facility. For example, if installed in a dry basin, the basin bottom may be used, along with the weight of the assembly, to unfold the floats.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A self-deploying float assembly to support a mechanical device on a surface of a liquid in a water or wastewater treatment basin, the self-deploying float assembly comprising:
   a mechanical device;
   a central support bracket forming a generally horizontal plane and having an upper surface and a lower surface and a generally central opening to receive and support the mechanical device, the mechanical device secured to at least a portion of the upper surface of the central support bracket;
   a plurality of floats, each float having at least an upper surface and a lower surface, a length and a cross-sectional shape, wherein a generally hollow chamber is formed along substantially the entire length of the floats, each float further including a proximal end and a distal end;
   a plurality of hinges, each hinge having two mating portions, a first portion attached and adjacent to the upper surface of the proximal end of each float and a second portion attached to the lower surface of the central support bracket, wherein each hinge pivotably mounting the proximal end of each float directly to the lower surface of the central support bracket such that each float may, using the liquid, the weight of the assembly and the buoyancy of the floats, pivot between a downward, generally vertical position prior to contact with the surface of the liquid and an upward, generally horizontal position upon placement of the assembly in the liquid for use in the water or wastewater treatment basin, and further wherein, when in the horizontal position, the first portion of each hinge is in substantial contact with the second portion of each hinge about the lower surface of the central support bracket, and the upper surface of the proximal end of each float is generally aligned with the upper surface of the central support bracket.

2. The self-deploying float assembly of claim 1 wherein the cross-sectional shape of each of said plurality of floats is a hexagon.

3. The self-deploying float assembly of claim 1 wherein at least one float of the plurality of floats includes a mooring bracket to secure the float assembly in the water or wastewater treatment basin.

4. The self-deploying float assembly of claim 1 wherein said hinges are mounted to a perimeter of the central support bracket, said hinges capable of preventing said floats from pivoting beyond a generally horizontal position.

5. The self-deploying float assembly of claim 1 wherein the proximal end of the upper surface of the floats includes a first aperture and the central support bracket includes a second aperture extending between the upper and the lower surfaces of the central support bracket such that each float is secured to the central support bracket in a generally horizontal position with a fastener cooperating with the first aperture on the upper surface of the float and the second aperture on the central support bracket.

6. The self-deploying float assembly of claim 5 wherein the first aperture of the upper surface of each float is a threaded locking aperture for securing the float in a generally horizontal position to the second aperture of the central support bracket with a bolt.

7. The self-deploying float assembly of claim 1 wherein the generally hollow chamber is filled with a foam to provide buoyancy.

8. The float assembly of claim 1 wherein the plurality of floats is four floats.

9. The float assembly of claim 1 wherein the plurality of floats is three floats.

10. A self-deploying float assembly to support a mechanical device on a surface of a liquid in a water or wastewater treatment basin, the self-deploying float assembly comprising:
a mechanical device;
a central support bracket forming a generally horizontal plane and having an upper surface and a lower surface and a generally central opening to receive and support the mechanical device, the mechanical device secured to at least the upper surface of the central support bracket;
a plurality of floats, each float having at least an upper surface and a lower surface, a length and a cross-sectional shape, wherein a generally hollow chamber is formed along substantially the entire length of the floats, each float further including a proximal end and a distal end;
a plurality of hinges, each hinge pivotably mounting the proximal end of each float directly to the lower surface of the central support bracket such that each float may, using the liquid, the weight of the assembly and the buoyancy of the floats, pivot between a downward, generally vertical position prior to contact with the surface of the liquid and an upward, generally horizontal position upon placement of the assembly in the liquid for use in the water or wastewater treatment basin, wherein when in the horizontal position, a substantial portion of the upper surface of each float is parallel to at least a perimeter portion of the lower surface of the central support bracket.

11. The self-deploying float assembly of claim 10 wherein the cross-sectional shape of each of said plurality of floats is a hexagon.

12. The self-deploying float assembly of claim 10 wherein at least one float of the plurality of floats includes a mooring bracket to secure the float assembly in the water or wastewater treatment basin.

13. The self-deploying float assembly of claim 10 wherein said hinges are mounted to a perimeter of the central support bracket, said hinges are capable of preventing said floats from pivoting beyond a generally horizontal position.

14. The self-deploying float assembly of claim 10 wherein the proximal end of the upper surface of the floats includes a first aperture and the central support bracket includes a second aperture extending between the upper and the lower surfaces of the central support bracket such that each float is secured to the central support bracket in a generally horizontal position with a fastener cooperating with the first aperture on the upper surface of the float and the second aperture on the central support bracket.

15. The self-deploying float assembly of claim 14 wherein the first aperture of the upper surface of each float is a threaded locking aperture for securing the float in a generally horizontal position to the second aperture of the central support bracket with a bolt.

16. The self-deploying float assembly of claim 10 wherein the generally hollow chamber is filled with a foam to provide buoyancy.

17. The float assembly of claim 10 wherein the plurality of floats is four floats.

18. The float assembly of claim 10 wherein the plurality of floats is three floats.

\* \* \* \* \*